United States Patent
Hashino et al.

(10) Patent No.: US 10,486,623 B2
(45) Date of Patent: Nov. 26, 2019

(54) HARNESS ROUTING STRUCTURE OF ELECTRIC VEHICLE

(71) Applicant: HONDA MOTOR CO., LTD., Minato-ku, Tokyo (JP)

(72) Inventors: Satoshi Hashino, Wako (JP); Toshikatsu Mori, Wako (JP); Hiroki Nakatani, Wako (JP); Shingo Miyamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/132,651

(22) Filed: Sep. 17, 2018

(65) Prior Publication Data

US 2019/0084504 A1 Mar. 21, 2019

(30) Foreign Application Priority Data

Sep. 21, 2017 (JP) ................... 2017-181243

(51) Int. Cl.
*B60R 16/02* (2006.01)
*H02G 3/04* (2006.01)

(52) U.S. Cl.
CPC ....... *B60R 16/0215* (2013.01); *H02G 3/0468* (2013.01); *H02G 3/0406* (2013.01)

(58) Field of Classification Search
CPC .. B60R 16/0215; B60R 16/02; H02G 3/0468; H02G 3/0406; H02G 3/04

USPC ................................................. 174/72 A
See application file for complete search history.

(56) References Cited

U.S. PATENT DOCUMENTS

2013/0213722 A1    8/2013  Mochizuki

FOREIGN PATENT DOCUMENTS

| JP | 2011-049825 | 3/2011 |
| JP | 2012-188020 | 10/2012 |
| JP | 2013-155582 | 8/2013 |
| JP | 2014-161154 | 9/2014 |
| JP | 2015-020544 | 2/2015 |
| WO | 2012063399 | 5/2012 |

OTHER PUBLICATIONS

Japanese Notice of Allowance for Japanese Patent Application No. 2017-181243 dated Apr. 2, 2019.

*Primary Examiner* — Tremesha S Willis
(74) *Attorney, Agent, or Firm* — Amin, Turocy & Watson LLP

(57) ABSTRACT

A harness routing structure for an electric vehicle includes a battery, an inverter device, and a harness configured to connect the battery and the inverter device. A length L of the harness between a battery fixing end of the battery to which the harness is fixed and an inverter fixing end of the inverter device to which the harness is fixed is an integer multiple of a parameter $\lambda a$ associated with a rising wavelength $\lambda$ when the inverter device is driven, and the parameter $\lambda a$ satisfies $0.462\lambda \leq \lambda a \leq 0.538\lambda$.

10 Claims, 11 Drawing Sheets

HARNESS ROUTING STRUCTURE OF ELECTRIC VEHICLE

CROSS-REFERENCE TO RELATED APPLICATION

Priority is claimed on Japanese Patent Application No. 2017-181243, filed Sep. 21, 2017, the content of which is incorporated herein by reference.

BACKGROUND OF THE INVENTION

Field of the Invention

The present invention relates to a harness routing structure for an electric vehicle.

Description of Related Art

In the related art, vehicles in which wire harnesses configured to electrically connect inverter devices disposed at the front portions of the vehicles and batteries disposed at the rear portions of the vehicles or the lower portions of the vehicles while preventing interference with other devices are known (for example, refer to PCT International Publication No. WO2012/063399).

SUMMARY OF THE INVENTION

In the vehicles in the related art, there is a problem that resonance currents generated in wire harnesses increase when inverter devices are driven and thus the electromagnetic noise emitted from the wire harnesses increases. Accordingly, it is desirable to minimize the occurrence of malfunctioning of electronic devices due to the electromagnetic noise emitted from the wire harnesses.

An aspect of the present invention was made in view of the above-described circumstances and an object of the present invention is to provide a harness routing structure for an electric vehicle capable of reducing electromagnetic noise emitted from a wire harness configured to connect a battery and an inverter device.

In order to accomplish this object by solving the above-described problem, the present invention adopts the following aspects.

(1) A harness routing structure for an electric vehicle according to an aspect of the present invention is a harness routing structure for an electric vehicle which includes a battery, an inverter device, and a harness configured to connect the battery and the inverter device, wherein: a length L of the harness between a battery fixing end of the battery to which the harness is fixed and an inverter fixing end of the inverter device to which the harness is fixed is an integer multiple of a parameter $\lambda a$ associated with a rising wavelength $\lambda$ when the inverter device is driven, and the parameter $\lambda a$ satisfies $0.462\lambda \leq \lambda a \leq 0.538\lambda$.

(2) In the above aspect (1), the harness may include a winding portion.

(3) In the above aspect (2), the winding portion may be disposed in a position in which the winding portion does not overlap with a power train of the electric vehicle in a front view.

(4) In the above aspect (2) or (3), the harness routing structure for the electric vehicle may include a fixing member configured to fix the winding portion to the electric vehicle.

(5) In the above aspect (4), the fixing member may be joined to a damper housing.

(6) In the above aspect (4) or (5), the fixing member may include a bending portion which is folded downward.

(7) In any one of the above aspects (4) to (6), the fixing member may include a plurality of supporting portions configured to support a plurality of different portions of the winding portion.

(8) In any one of the above aspects (4) to (7), the fixing member may include a bending flange portion.

(9) In any one of the above aspects (4) to (8), the harness may include a battery-side harness connected to the battery and an inverter-side harness connected to the inverter device, and the fixing member may include a covering portion configured to cover at least part of a connecting portion between the battery-side harness and the inverter-side harness.

(10) In any one of the above aspects (2) to (9), the harness may include a twisted tube configured to cover the winding portion.

According to the above aspect (1), the rising wavelength $\lambda$ when the inverter device is driven is the wavelength of the noise current generated due to the high frequency component of the switching current generated when the inverter device is driven.

When the length L of the harness is an integer multiple of a rising wavelength which is about ½ of the rising wavelength $\lambda$, it is possible to minimize an increase in resonance current caused by the noise current and to reduce the electromagnetic noise emitted from the harness along with the resonance current. When the parameter $\lambda a$ is set to satisfy $0.462\lambda \leq \lambda a \leq 0.538\lambda$, and the length L of the harness is an integer multiple of the parameter $\lambda a$, it is possible to reduce the actual electromagnetic noise emitted from the harness in the electric vehicle to a predetermined specified value or less. On the other hand, when the parameter $\lambda a$ is less than $0.462\lambda$ or larger than $0.538\lambda$, the electromagnetic noise emitted from the harness is larger than a predetermined specified value and thus malfunctioning of an electronic device is likely to occur due to the electromagnetic noise.

In the case of the above (2), it is possible to easily adjust the length L of the harness using the winding portion. It is possible to easily extend the wire harness while an increase in space required for disposition is minimized using the winding portion.

In the case of the above (3), it is possible to secure electrical safety using the winding portion without interfering with the power train even when the power train is displaced in a forward/rearward direction of the electric vehicle.

In the case of the above (4), it is possible to easily fix the winding portion and to improve the manufacturing efficiency of the electric vehicle.

In the case of the above (5), it is possible for the fixing member to increase a plate thickness of the damper housing and to increase the rigidity of the damper housing. Thus, it is possible to improve the riding comfort performance of the electric vehicle.

In the case of the above (6), it is possible to increase the rigidity of the fixing member and to reduce the thickness of the fixing member along with the increase in rigidity. Furthermore, it is possible to reduce a size of a hood in the electric vehicle and to improve the aerodynamic performance and the aesthetics.

In the case of the above (7), it is possible to prevent the swing of the wire harness and the winding portion and to minimize occurrence of noise and vibration.

In the case of the above (8), it is possible to prevent the wire harness and the winding portion from directly coming into contact with or colliding with the vehicle body even when the wire harness and the winding portion swing.

In the case of the above (9), since the wire harness is configured to be dividable, it is possible to secure ease of manufacture. Since the covering portion configured to cover at least part of the connecting portion is provided, it is possible to prevent the connection of the wire harness from being released by mistake while the electric vehicle is being inspected or the like.

In the case of the above (10), it is possible to reduce a winding diameter compared with, for example, when the winding portion is covered with a corrugated tube or the like and thus to improve mountability in the vehicle.

DETAILED DESCRIPTION OF THE INVENTION

Figure 1:
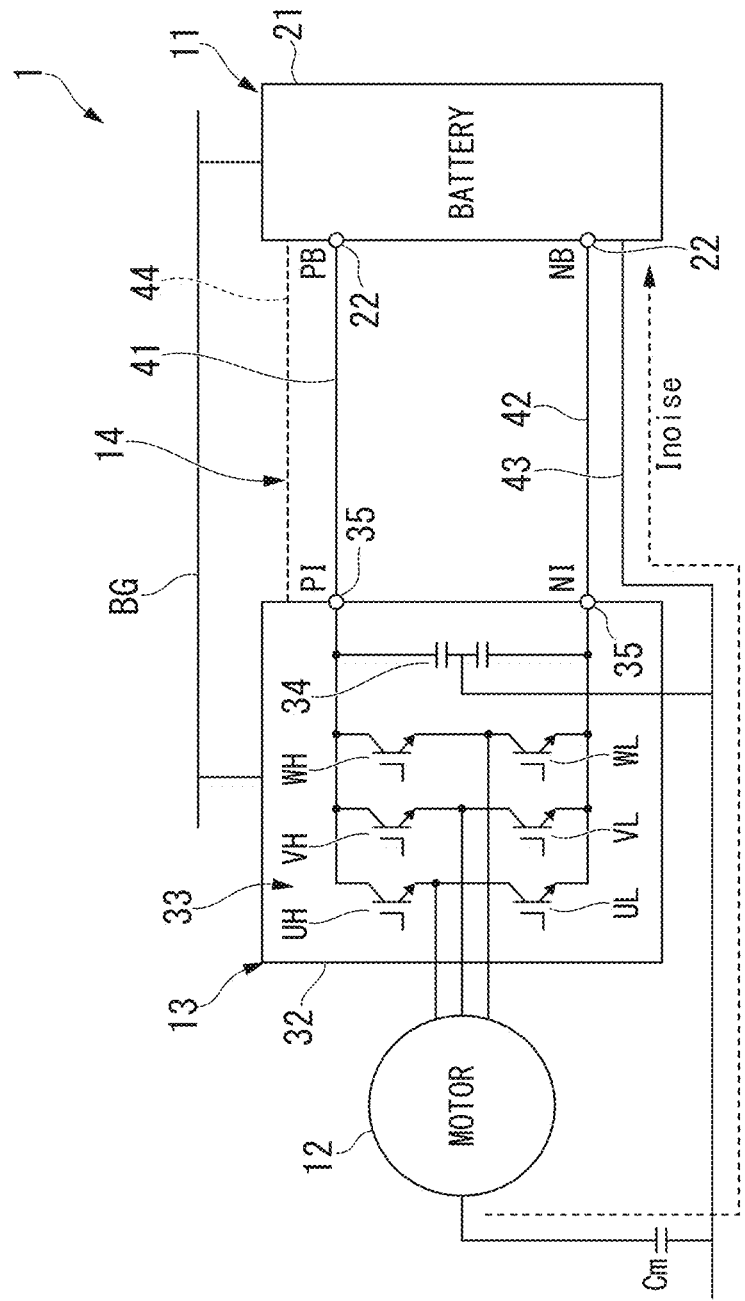
FIG. 1 is a diagram schematically showing a constitution of part of an electric vehicle according to an embodiment of the present invention.

An embodiment of a harness routing structure of an electric vehicle according to the present invention will be described below with reference to the accompanying drawings.

The harness routing structure of the electric vehicle according to the embodiment is a routing structure of a wire harness 14 configured to electrically connect a battery 11 installed in an electric vehicle 1 and an inverter device 13 configured to control a motor 12. Examples of the electric vehicle 1 include electric vehicles, hybrid vehicles, fuel cell vehicles, and the like. Electric vehicles are driven using batteries as power sources. Hybrid vehicles are driven using batteries and internal combustion engines as power sources. Fuel cell vehicles are driven using fuel cells as driving sources. Examples of the motor 12 include a pump driving motor included in an electric compressor in an air conditioning device, a travel driving motor of the electric vehicle 1, an electric power generating motor, or the like. Examples of the inverter device 13 include an inverter device for a pump configured to rotatably drive a pump driving motor, a driving inverter device configured to rotatably drive a travel driving motor, an inverter device for electric power generation configured to control an electric power generating motor, and the like.

Figure 2:
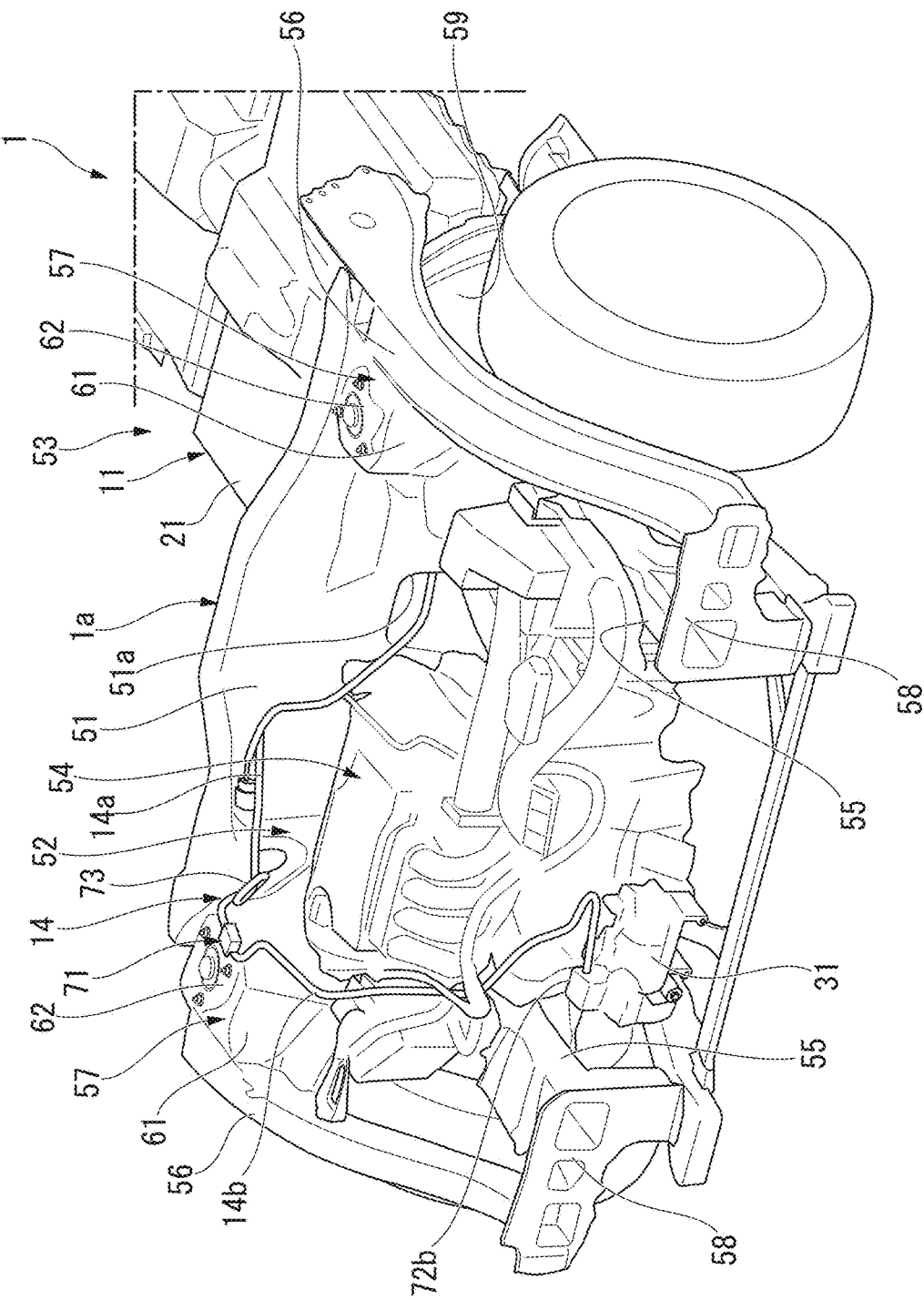
FIG. 2 is a perspective view of part of a front structure of the electric vehicle according to the embodiment of the present invention viewed from a front side thereof toward a rear side thereof.
Figure 3:
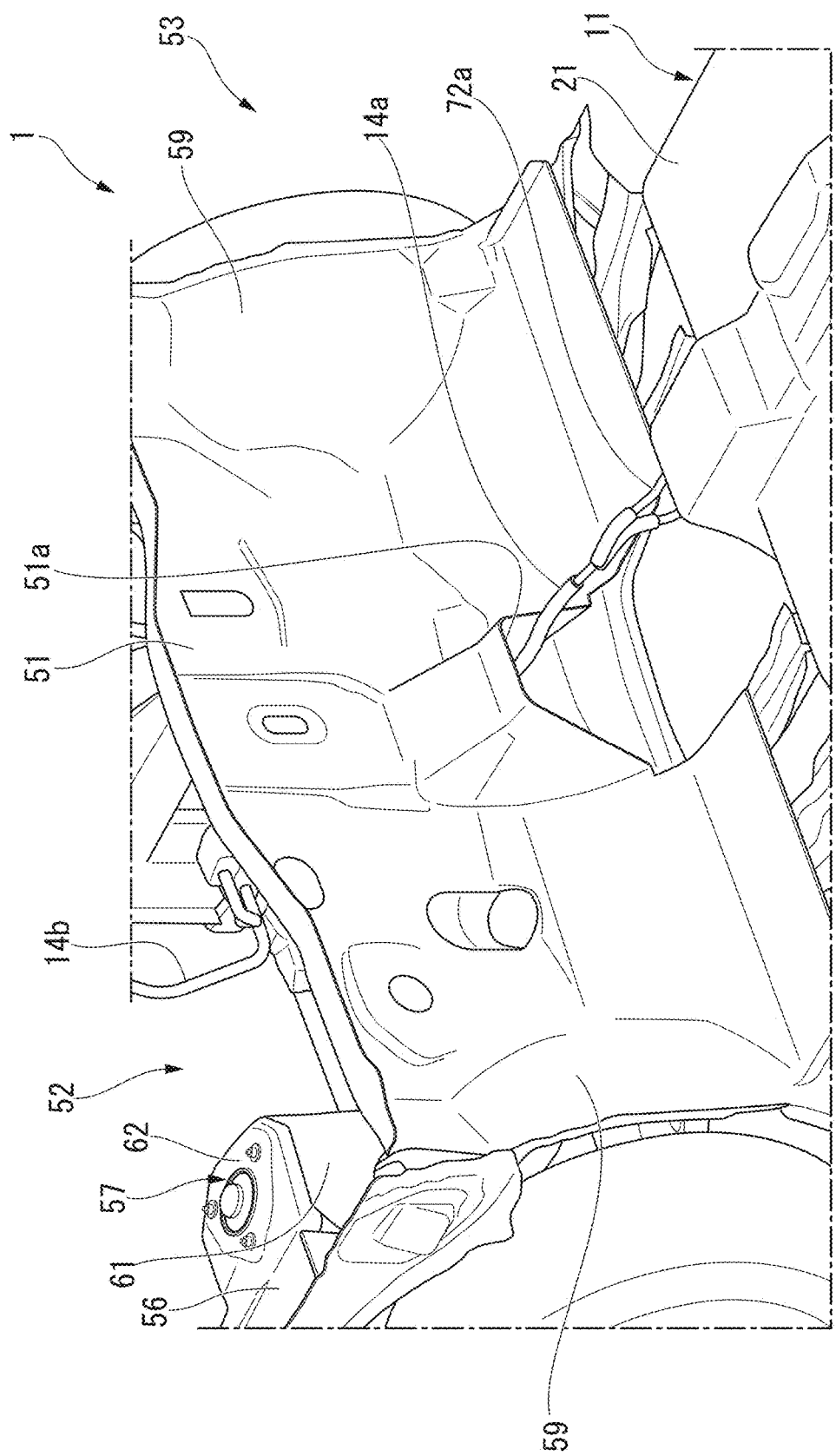
FIG. 3 is a perspective view of part of the front structure of the electric vehicle according to the embodiment of the present invention viewed from the rear side thereof toward the front side thereof.

An example in which the electric vehicle 1 is a hybrid vehicle, the motor 12 is a pump driving motor of an electric compressor, and the inverter device 13 is an inverter device for a pump will be described below. FIG. 1 is a diagram schematically showing a constitution of part of the electric vehicle 1 according to an embodiment of the present invention. FIG. 2 is a perspective view of part of a front structure of the electric vehicle 1 according to the embodiment of the present invention viewed from a front side thereof toward a rear side thereof. FIG. 3 is a perspective view of part of the front structure of the electric vehicle 1 according to the embodiment of the present invention viewed from the rear side thereof toward the front side thereof.

The battery 11 includes a case 21 and a plurality of battery modules accommodated in the case 21. The battery modules include a plurality of battery cells connected in series. The case 21 includes a battery connector 22 configured to fix the wire harness 14. The battery connector 22 is a battery fixing end configured to fix the wire harness 14 in the battery 11. The battery connector 22 includes positive electrode side terminals PB and negative electrode side terminals NB connected to positive electrode terminals and negative electrode terminals of the plurality of battery modules connected in series in the case 21.

The motor 12 is provided in an electric compressor 31. For example, the motor 12 is a three-phase alternating current (AC) brushless direct current (DC) motor. The three phases may be a U phase, a V phase, and a W phase. The motor 12 includes a rotor having a permanent magnet used for a field magnet and a stator configured to generate a rotating magnetic field which rotates the rotor. The motor 12 is rotatably driven by a three-phase AC current output from the inverter device 13.

The inverter device 13 is integrally formed with the electric compressor 31. The inverter device 13 includes a housing 32, a bridge circuit 33 accommodated in the housing 32, a noise filter 34, and a smoothing capacitor. The housing 32 includes an inverter connector 35 configured to fix the wire harness 14. The inverter connector 35 is an inverter fixing end configured to fix the wire harness 14 in the inverter device 13. The inverter connector 35 includes a positive electrode side terminal PI and a negative electrode side terminal NI.

The bridge circuit 33 includes a plurality of switching elements which are bridge-connected. For example, the switching elements may be transistors such as insulated gate bipolar transistors (IGBTs) or metal oxide semi-conductor field effect transistors (MOSFETs). The bridge circuit 33 is driven using a pulse width modulated signal.

For example, in the bridge circuit 33, a pair of high-side and low-side U-phase transistors UH and UL, a pair of high-side and low-side V-phase transistors VH and VL, and a pair of high-side and low-side W-phase transistors WH and WL are bridge-connected. Collectors of the high-side transistors UH, VH, and WH are connected to the positive electrode side terminal PI to form a high side arm. Emitters of the low-side transistors UL, VL, and WL are connected to the negative electrode side terminal NI to form a low side arm. In each phase, the emitters of the transistors UH, VH, and WH in the high side arm are connected to the collectors of the transistors UL, VL, and WL in the low side arm. In each phase, connection points between the transistors UH, VH and WH in the high side arm and the transistors UL, VL, and WL in the low side arm are connected to a stator winding of each phase of the motor 12. The bridge circuit 33 include diodes connected between the collectors and the emitters of the transistors UH, UL, VH, VL, WH, and WL such that forward directions thereof are directed from the emitters toward the collectors.

The noise filter 34 and the smoothing capacitor are connected between the positive electrode side terminal PI and the negative electrode side terminal NI to be parallel to the bridge circuit 33.

The inverter device 13 switches on (conduction)/off (cutoff) of each of a pair of transistors in each phase on the basis of a gate signal serving as a switching command input to a gate of each transistor UH, VH, WH, UL, VL, or WL. The inverter device 13 applies electricity of a U phase AC current, a V phase AC current, and a W phase AC current to a stator winding of each phase by converting DC power supplied from the battery 11 into three-phase AC power and sequentially commutating electricity applied to each stator winding of the three-phase motor 12.

The wire harness 14 includes a pair of a positive-side electric wire 41 and a negative-side electric wire 42 for electric power supply, a shield wire 43, and a covering member 44. The pair of the positive-side electric wire 41 and the negative-side electric wire 42 are electrically connected to the positive electrode side terminals PB and the negative electrode side terminals NB of the battery 11 when the wire harness 14 is fixed to the battery connector 22. The pair of the positive-side electric wire 41 and the negative-side electric wire 42 are electrically connected to the positive electrode side terminal PI and the negative electrode side terminal NI of the inverter device 13 when the wire harness 14 is fixed to the inverter connector 35. The shield wire 43 is electrically connected to the case 21 of the battery 11 and the housing 32 of the inverter device 13 and is connected to a body ground BG of the electric vehicle 1 via the case 21 and the housing 32. The covering member 44 integrally covers the positive-side electric wire 41, the negative-side electric wire 42, and the shield wire 43.

The electric vehicle 1 includes a dashboard lower panel 51 configured to partition the front and rear of a vehicle body 1a.

The dashboard lower panel 51 partitions a power loading chamber 52 in the front of the vehicle body and the vehicle compartment 53 provided behind the power loading chamber 52. For example, the battery 11 is disposed below a floor panel in the vehicle compartment 53. The electric compressor 31 including the motor 12 and the inverter device 13 is disposed in front of a power train 54 such as the internal combustion engine and the travel driving motor in the power loading chamber 52. The wire harness 14 is inserted into a through portion 51a formed at a central portion at a lower portion of the dashboard lower panel 51 in a vehicle width direction and connects the battery 11 of the vehicle compartment 53 and the inverter device 13 of the power loading chamber 52.

A pair of front side frames 55 and 55, a pair of upper members 56 and 56, and a pair of damper housings 57 and 57 are provided on a front portion of the vehicle body on a front side thereof compared with the dashboard lower panel 51.

The pair of front side frames 55 and 55 are disposed apart from each other on both sides at a lower portion of the power loading chamber 52 in the vehicle width direction. Each of the front side frames 55 extends in a forward/rearward direction of the vehicle body.

The pair of upper members 56 and 56 are disposed apart from each other on both sides at an upper portion of the power loading chamber 52 in the vehicle width direction. A gap between the pair of upper members 56 and 56 in the vehicle width direction is larger than a gap between the pair of the front side frames 55 and 55 in the vehicle width direction. Each of the pair of the upper members 56 and 56 is disposed to be deviated outward in the vehicle width direction with respect to each of the pair of the front side frames 55 and 55. The upper members 56 extend forward from a front pillar and curve downward. Front ends of the upper members 56 are joined to front ends of the front side frames 55 using connecting members 58.

The damper housings 57 accommodate upper portions of damper units connected to wheels. Each of the damper housings 57 is disposed between the dashboard lower panel 51, the front side frames 55, and the upper members 56. The damper housing 57 is joined to a wheel house portion 59 of the dashboard lower panel 51, an inner lateral surface near a rear portion of the upper member 56, and an outer lateral surface near a rear portion of the front side frames 55. The wheel house portion 59 in the dashboard lower panel 51 is a portion that is curved for a rear portion of a wheel house to be formed in the dashboard lower panel 51.

The damper housing 57 includes a lateral wall 61 and a damper base 62. The lateral wall 61 surrounds the damper unit together with a lateral wall of the upper members 56 on an inner side in the vehicle width direction. The damper base 62 is attached to an upper end of the lateral wall 61. The damper base 62 supports the upper end of the damper unit using bolt-fastening or the like.

Figure 4:
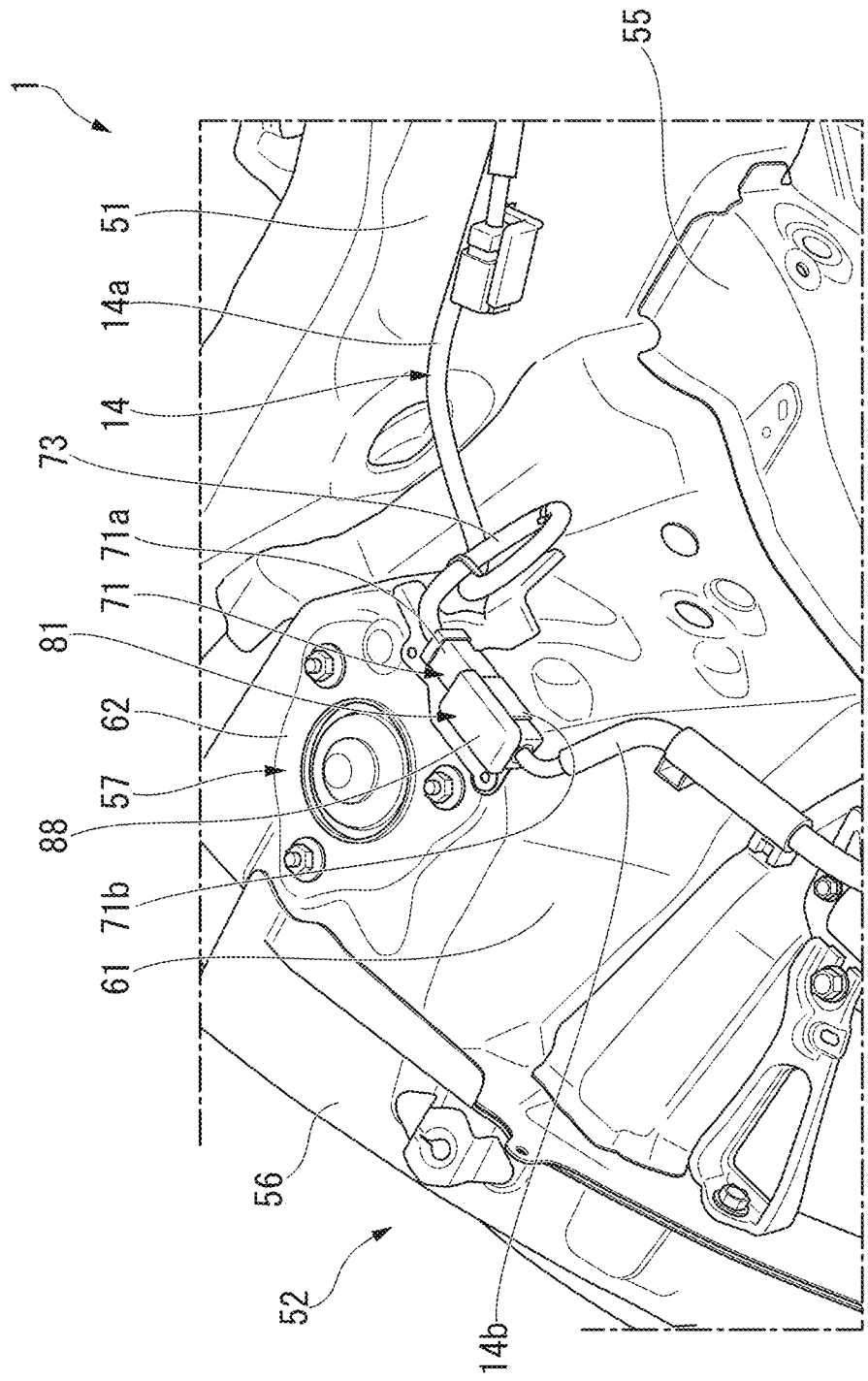
FIG. 4 is an enlarged perspective view of a harness routing structure of the electric vehicle according to the embodiment of the present invention viewed from an upper side thereof toward a lower side thereof.
Figure 5:
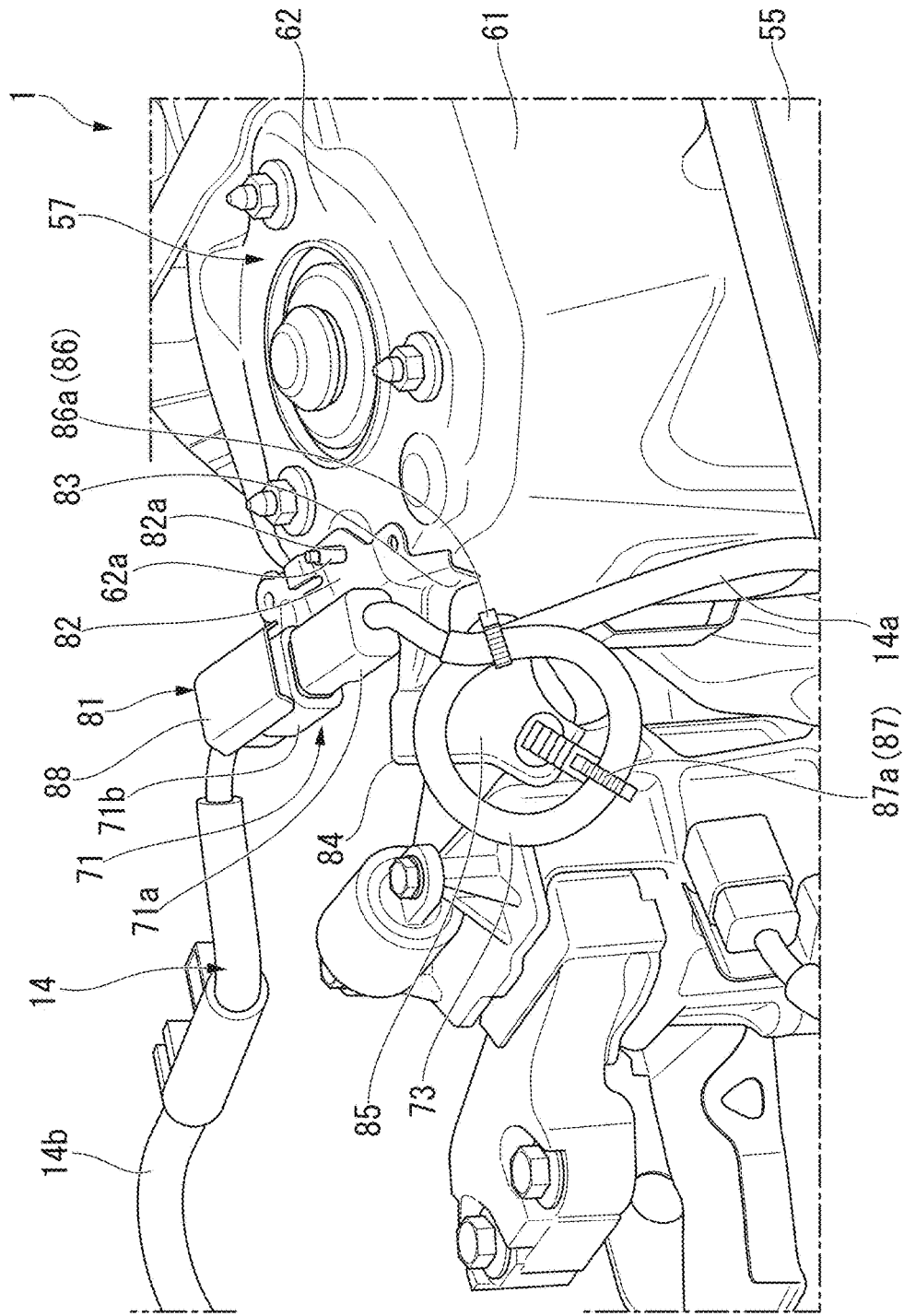
FIG. 5 is an enlarged perspective view of the harness routing structure of the electric vehicle according to the embodiment of the present invention viewed from a rear side thereof toward a front side thereof.
Figure 6:
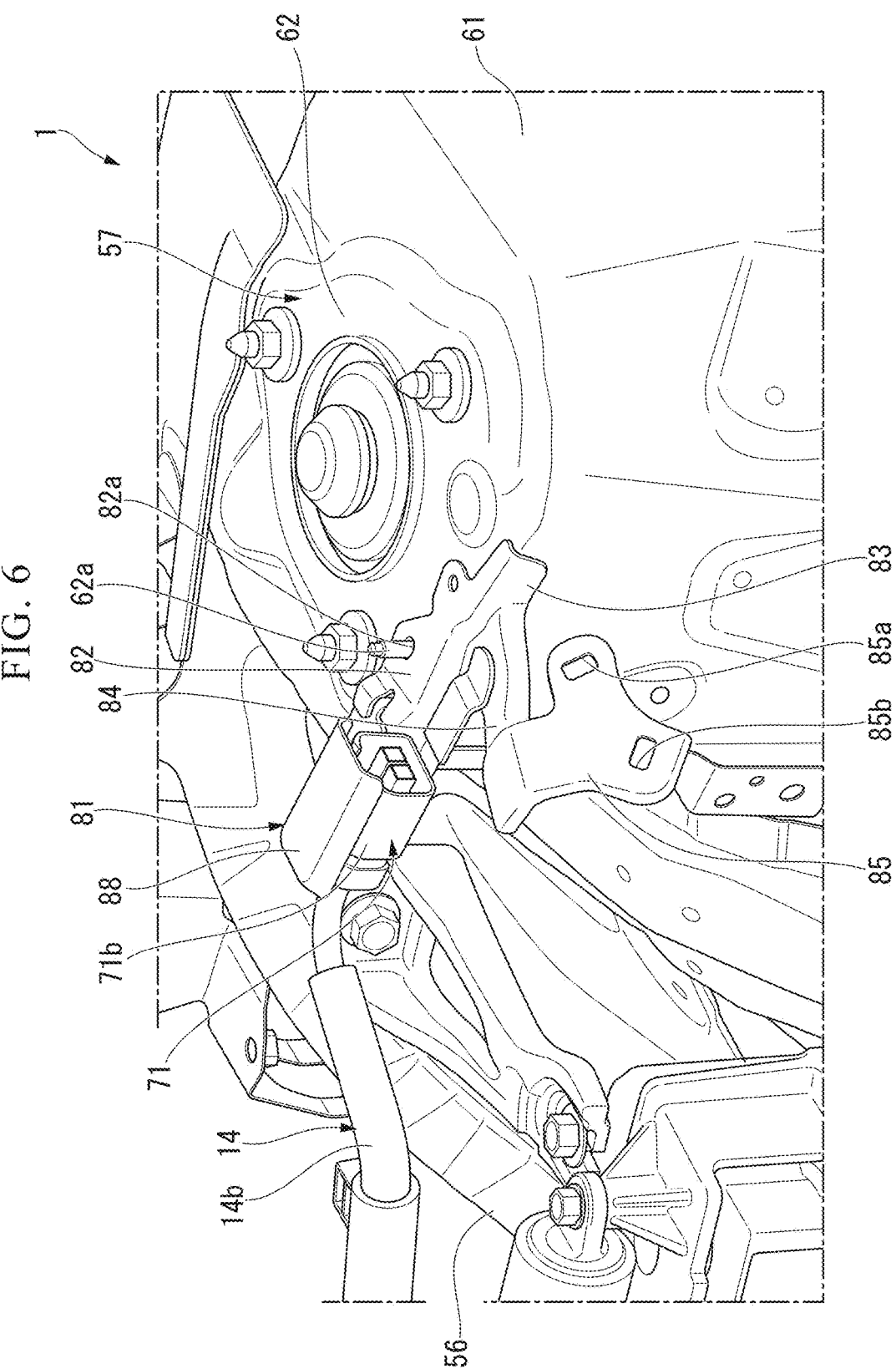
FIG. 6 is an exploded enlarged perspective view of part of the harness routing structure of the electric vehicle according to the embodiment of the present invention.

The harness routing structure of the electric vehicle 1 according to the embodiment will be described in detail below. FIG. 4 is an enlarged perspective view of a harness routing structure of the electric vehicle 1 according to the embodiment of the present invention viewed from an upper side thereof toward a lower side thereof. FIG. 5 is an enlarged perspective view of the harness routing structure of the electric vehicle 1 according to the embodiment of the present invention viewed from a rear side thereof toward a front side thereof. FIG. 6 is an exploded enlarged perspective view of part of the harness routing structure of the electric vehicle 1 according to the embodiment of the present invention.

The wire harness 14 is dividable into a battery-side harness 14a and an inverter-side harness 14b using a connecting portion 71 provided at a predetermined position thereof in a lengthwise direction. The connecting portion 71 includes a first connector 71a provided in the battery-side harness 14a and a second connector 71b provided in the inverter-side harness 14b. The first connector 71a and the second connector 71b can be attached to or detached from each other and electrically connect or disconnect the battery-side harness 14a and the inverter-side harness 14b. As shown in FIGS. 3 and 4, the battery-side harness 14a includes a third connector 72a attached to or detached from the battery connector 22 and the first connector 71a on both ends thereof in the lengthwise direction. As shown in FIGS. 2 and 4, the inverter-side harness 14b includes the second connector 71b and a fourth connector 72b attached to or detached from the inverter connector 35 on both ends thereof in the lengthwise direction.

The wire harness 14 includes a winding portion 73 provided for adjusting a length. For example, the winding portion 73 is provided in the vicinity of the first connector 71a in the battery-side harness 14a. For example, the covering member 44 configured to cover the winding portion 73 is a twisted tube.

As shown in FIGS. 5 and 6, the connecting portion 71 and the winding portion 73 of the wire harness 14 are fixed to the damper housing 57 using a fixing member 81. For example, the fixing member 81 is a bracket which forms a cantilever-like supporting tool. The fixing member 81 includes a joint portion 82, a bending flange portion 83, a protruding portion 84, a bending portion 85, a first supporting portion 86, a second supporting portion 87, and a covering portion 88.

The joint portion 82 is joined to the damper base 62 in the damper housing 57. For example, a shape of the joint portion 82 is formed in a plate shape. A pin 62a protruding from a surface of the damper base 62 is inserted into a pin installing hole 82a formed in the joint portion 82 so that the joint portion 82 is joined to the damper base 62. The bending flange portion 83 is joined to an end of the joint portion 82 and provided to be covered with an end of the damper base 62 on an inner side in the vehicle width direction. For example, a shape of the bending flange portion 83 is formed in a plate shape in which the bending flange portion 83 is curved along a surface of an end of the damper base 62. The protruding portion 84 is joined to the bending flange portion 83 and protrudes inward in the vehicle width direction from the bending flange portion 83. For example, a shape of the protruding portion 84 is formed in a plate shape. The bending portion 85 is joined to a portion of a distal end of the protruding portion 84 on the rear side of the vehicle body and is bent so that the bending portion 85 is folded downward. For example, a shape of the bending portion 85 is formed in a plate shape. The first supporting portion 86 and the second supporting portion 87 are provided in the bending portion 85. The first supporting portion 86 and the second supporting portion 87 support two different portions of the winding portion 73 using a first harness clip 86a and a second harness clip 87a installed in a first support hole 85a and a second support hole 85b formed in the bending portion 85. The covering portion 88 is joined to the joint portion 82 and covers at least part of the connecting portion 71 of the wire harness 14. For example, a shape of the covering portion 88 is formed in a plate shape in which the covering portion 88 is bent along a surface of the connecting portion 71.

As shown in FIGS. 2 and 3, the battery-side harness 14a of the wire harness 14 extends from the vehicle compartment 53 side to the power loading chamber 52 side through the through portion 51a of the dashboard lower panel 51. The battery-side harness 14a extends upward along a panel surface of the dashboard lower panel 51 from the through portion 51a of the dashboard lower panel 51 in the power loading chamber 52. The battery-side harness 14a is curved outward in the vehicle width direction from the vicinity of an upper end of the dashboard lower panel 51 and extends toward the damper housing 57. The winding portion 73 provided in the battery-side harness 14a is disposed in a position in which the winding portion 73 does not overlap with the power train 54 in a front view of the electric vehicle 1 in front of the damper housing 57. The winding portion 73 of the battery-side harness 14a and the first connector 71a are fixed to the damper housing 57 by the fixing member 81.

The second connector 71b of the inverter-side harness 14b in the wire harness 14 is fixed to the damper housing 57 by the fixing member 81. The inverter-side harness 14b extends further forward from the damper housing 57 than the power train 54. The inverter-side harness 14b is curved downward in front of the power train 54 and extends toward the electric compressor 31.

Figure 7:
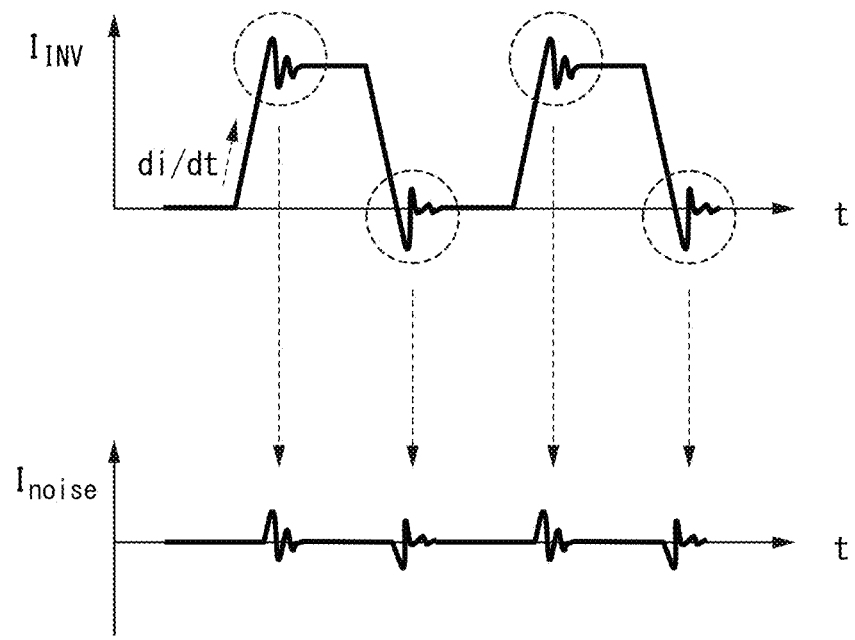
FIG. 7 is a diagram illustrating an example of a switching current and a noise current generated when an inverter device according to an embodiment of the present invention is driven.
Figure 8:
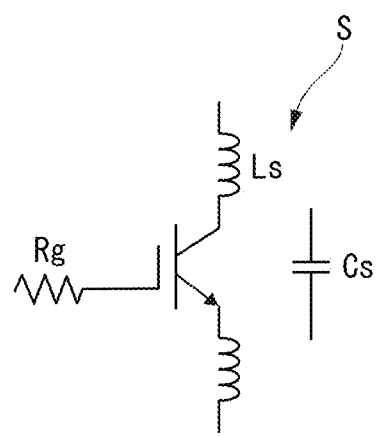
FIG. 8 is a diagram showing a parasitic inductance, a stray capacitance, and a gate resistance of a switching element of the inverter device according to the embodiment of the present invention.
Figure 9:
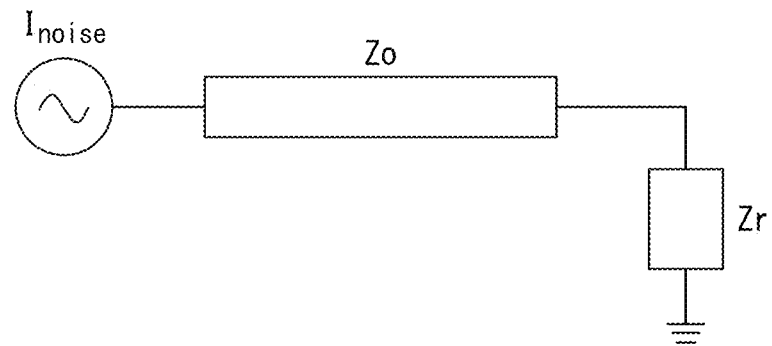
FIG. 9 is a diagram showing an impedance equivalent circuit of a wire harness viewed from a signal source of a noise current according to an embodiment of the present invention.
Figure 10:
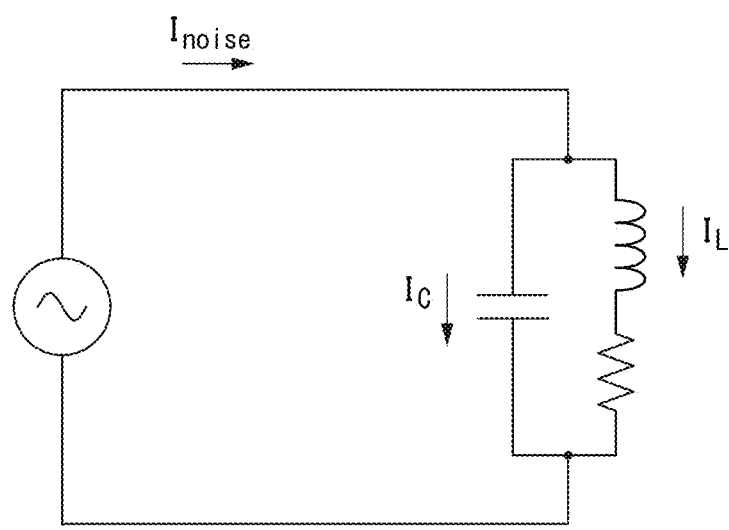
FIG. 10 is a diagram showing an LCR parallel resonance circuit associated with the impedance equivalent circuit shown in FIG. 9.

Length adjustment using the winding portion 73 in the wire harness 14 of the electric vehicle 1 according to the embodiment will be described in detail below. FIG. 7 is a diagram illustrating an example of a switching current $I_{INV}$ and a noise current $I_{noise}$ generated when the inverter device 13 is driven. FIG. 8 is a diagram showing a parasitic inductance Ls, a stray capacitance Cs, and a gate resistance Rg of a switching element S of the inverter device 13. FIG. 9 is a diagram showing an impedance equivalent circuit of the wire harness 14 viewed from a signal source of the noise current $I_{noise}$. FIG. 10 is a diagram showing an LCR parallel resonance circuit associated with the impedance equivalent circuit shown in FIG. 9.

A length L of the wire harness 14 between the battery connector 22 and the inverter connector 35 is an integer multiple of a parameter λa associated with a rising wavelength λ when the inverter device 13 is driven. The parameter λa is at least $1.52\lambda/4 \leq \lambda a \leq 2.52\lambda/4$ and preferably $0.462\lambda \leq \lambda a \leq 0.538\lambda$.

The length L of the wire harness 14 is set so that the electromagnetic noise emitted from the wire harness 14 along with a resonance current generated in the wire harness 14 when the inverter device 13 is driven is reduced to a predetermined specified value or less. An input current with respect to the resonance current generated in the wire harness 14 when the inverter device 13 is driven is a noise current $I_{noise}$ generated due to a high frequency component of a switching current $I_{INV}$ generated when the inverter device 13 is driven.

As shown in FIG. 1, the noise current $I_{noise}$ generated in the inverter device 13 passes through a stray capacitance Cm between the motor 12 and the vehicle body and flows to the vehicle body. The noise current $I_{noise}$ causes the electromagnetic noise to be emitted from the shield wire 43 when flowing through the shield wire 43 of the wire harness 14 connected to the vehicle body.

The noise current $I_{noise}$ is generated due to a high frequency component of a sharp current change (di/dt) of a switching current $I_{INV}$ during a switching operation of the inverter device 13 shown in FIG. 7 and the resonance of a secondary resonance point due to the parasitic inductance Ls and the stray capacitance Cs of the switching element S in the inverter device 13 shown in FIG. 8. A rising time of the switching current $I_{INV}$ is defined by a gate resistance Rg of the switching element S. Therefore, a frequency fs of the noise current $I_{noise}$ is uniquely determined by the parasitic inductance Ls, the stray capacitance Cs, and the gate resistance Rg of the switching element S. The parasitic inductance Ls, the stray capacitance Cs, and the gate resistance Rg of the switching element S are constant values with respect to the system. Thus, the frequency fs of the noise current $I_{noise}$ is a constant value regardless of an operation state of the electric vehicle 1, the inverter device 13, and the like. A wavelength of the noise current $I_{noise}$ is a rising wavelength λ when the inverter device 13 is driven and the rising wavelength λ is described based on the speed of light C as λ=C/fs.

For example, in the impedance equivalent circuit shown in FIG. 9, impedance Z viewed from the signal source of the noise current $I_{noise}$ is described as represented by the following Expression (1). The impedance equivalent circuit in FIG. 9 is constituted of a characteristic impedance $Z_0$ of the shield wire 43 in the wire harness 14 and a load impedance $Z_r$ of a terminal tip in the wire harness 14.

[Math. 1]

$$Z = Z_0 \frac{Z_r + jZ_0 \tan\frac{2\pi}{\lambda}L}{Z_0 + jZ_r \tan\frac{2\pi}{\lambda}L} \quad (1)$$

Since the load impedance $Z_r$ is connected to the vehicle body, the foregoing Expression (1) is described as represented by the following Expression (2) if $Z_r \approx 0$ is satisfied due to a short-circuit termination.

[Math. 2]

$$Z = Z_0 \frac{jZ_0 \tan\frac{2\pi}{\lambda}L}{Z_0} = jZ_0 \tan\frac{2\pi}{\lambda}L \quad (2)$$

In the foregoing Expression (2), when the length L of the wire harness 14 satisfies L=λ/4, so-called parallel resonance is provided and the impedance Z becomes a maximum value as represented by the following Expression (3).

[Math. 3]

$$Z = jZ_0 \tan\frac{2\pi}{\lambda}L = jZ_0 \tan\frac{\pi}{\lambda} = \infty \quad (3)$$

In the foregoing Expression (2), when the length L of the wire harness 14 satisfies L=λ/2, so-called series resonance is provided and the impedance Z becomes a minimum value as represented by the following Expression (4).

[Math. 4]

$$Z = jZ_0 \tan\frac{2\pi}{\lambda}L = jZ_0 \tan\pi = 0 \quad (4)$$

Figure 11:
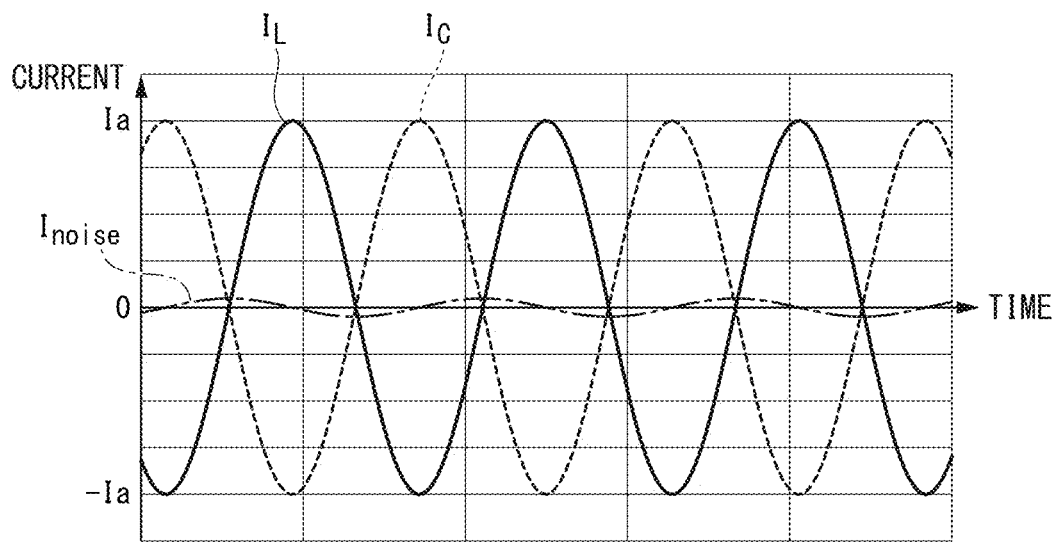
FIG. 11 is a diagram showing a first result of associating the impedance equivalent circuit shown in FIG. 9 with the LCR parallel resonance circuit shown in FIG. 10 and performing calculation through simulation of current waveforms of a reactor current and a capacitor current with respect to a noise current serving as an input current.
Figure 12:
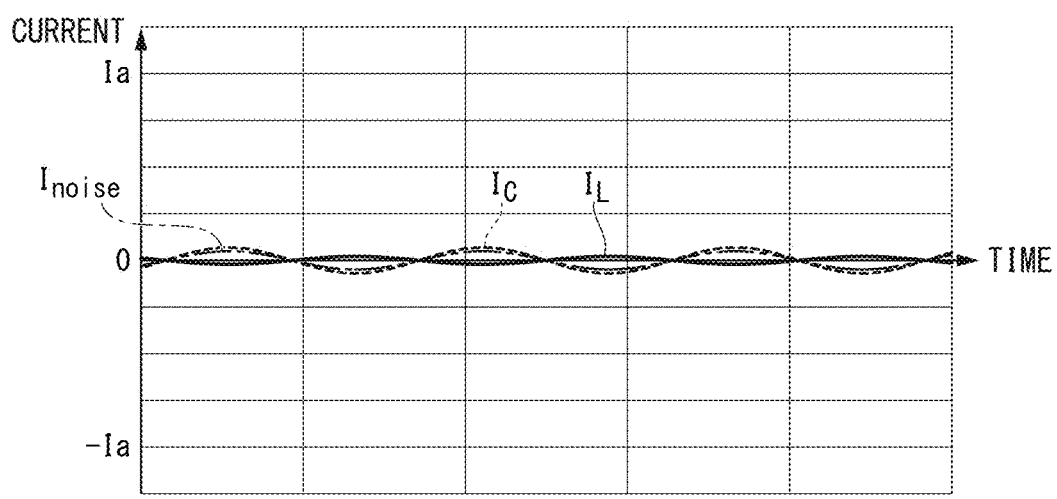
FIG. 12 is a diagram showing a second result of associating the impedance equivalent circuit shown in FIG. 9 with the LCR parallel resonance circuit shown in FIG. 10 and performing calculation through simulation of current waveforms of a reactor current and a capacitor current with respect to a noise current serving as an input current.

FIGS. 11 and 12 are diagrams showing results of associating the impedance equivalent circuit shown in FIG. 9 with the LCR parallel resonance circuit shown in FIG. 10 and performing calculation through simulation of current waveforms of a reactor current $I_L$ and a capacitor current $I_C$ with respect to a noise current $I_{noise}$ serving as an input current. FIG. 11 illustrates a case in which a resonance frequency of an LCR parallel resonance circuit is set to a frequency that is the same as that corresponding to L=λ/4 with respect to a frequency of a noise current $I_{noise}$ and it is seen that a reactor current $I_L$ and a capacitor current $I_C$ are amplified by resonance. FIG. 12 illustrates a case in which the resonance frequency of the LCR parallel resonance circuit is set to a frequency that is ½ that corresponding to L=λ/2 with respect to the frequency of the noise current $I_{noise}$ and it is seen that a reactor current $I_L$ and a capacitor current $I_C$ are not amplified by resonance.

Figure 13:
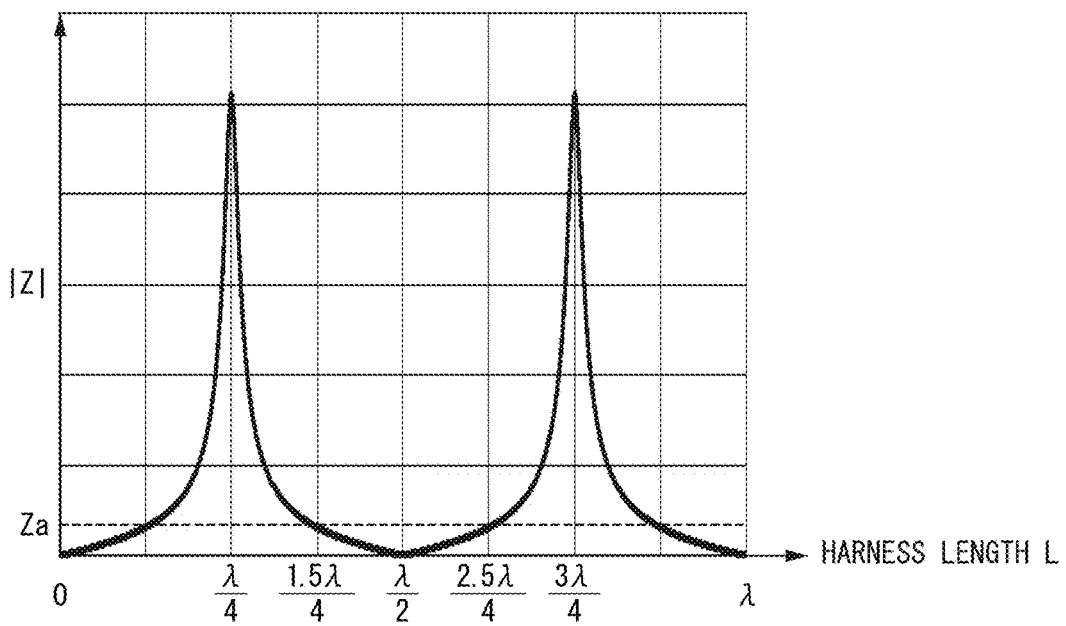
FIG. 13 is a diagram showing a relationship between impedance and a length of a wire harness in the impedance equivalent circuit shown in FIG. 9.

FIG. 13 is a diagram showing a relationship between an impedance Z and a length L of the wire harness 14 in the impedance equivalent circuit shown in FIG. 9. Note that, in FIG. 13, for example, a load impedance $Z_r$ satisfies $Z_r$=0.1, which is a sufficiently small value with respect to the characteristic impedance $Z_0$ of the shield wire 43 in the wire harness 14.

In order to reduce the electromagnetic noise emitted from the wire harness 14, it is necessary to reduce the impedance Z and reduce the resonance current of the wire harness 14. When the impedance Z for reducing the electromagnetic noise to a predetermined specified value or less is defined as |Z|=Za, the length L of the wire harness 14 is at least an integer multiple of a parameter λa defined by 1.52λ≤λa≤2.5λ/4. More preferably, the parameter λa satisfies 0.462λ≤λa≤0.538λ, from the actual test results for the electric vehicle 1.

Figure 14:
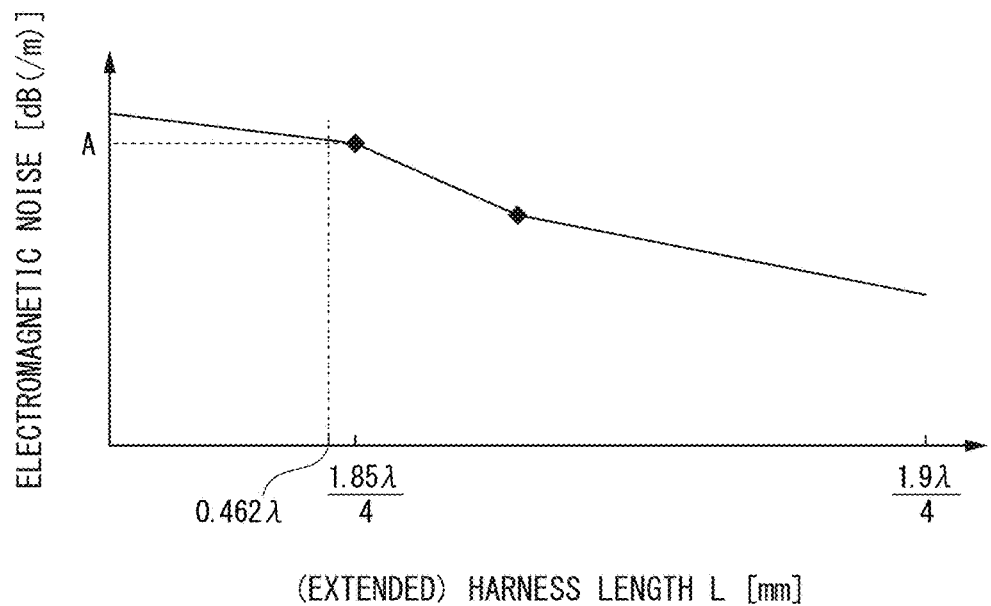
FIG. 14 is a diagram illustrating an example of a relationship between the electromagnetic noise emitted from a wire harness and a length of the wire harness, which is data obtained from an actual test performed on an electric vehicle according an embodiment of the present invention.

FIG. 14 is a diagram illustrating an example of a relationship between the electromagnetic noise emitted from the wire harness 14 and a length L of the wire harness 14, which is data obtained from an actual test performed on the electric vehicle 1. The actual test performed on the electric vehicle 1 is performed by measuring the electromagnetic noise emitted from the electric vehicle 1 using an external antenna in a state in which the electric compressor 31 of the air conditioning device is operated while an external charger is charging the battery 11. For example, a frequency of a noise current $I_{noise}$ is 50 MHz. The length L of the wire harness 14 is a length after extension in which the winding portion 73 is provided relative to an initial length L0 before extension in which the winding portion 73 is not provided. For example, the initial length L0 is 2593.4 mm, which is a length that is about 404 mm shorter than ½ of a wavelength $\lambda(=5995.8$ mm) $(\lambda/2=2997.9$ mm) at 50 MHz.

Referring to FIG. 14, it is acknowledged that, as the length L of the wire harness 14 is extended from the initial length L0($\approx$1.73$\lambda$/4) toward a length that is ½ of the wavelength $\lambda$($\lambda$/2=2997.9 mm) at 50 MHz, electromagnetic noise changes to a decreasing trend. For example, electromagnetic noise is a predetermined threshold value A or less when the length L of the wire harness 14 is 0.462$\lambda$ or more.

Figure 15:
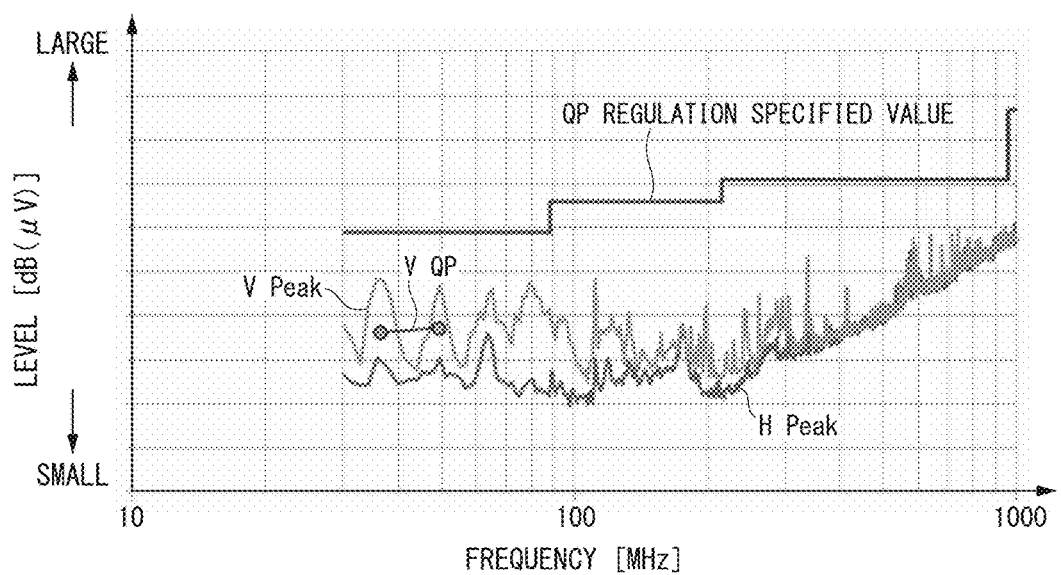
FIG. 15 is a diagram illustrating an example of a measurement result of an emission level of electromagnetic noise when a length of a wire harness according to an embodiment of the present invention is extended by a predetermined length using a winding portion.
Figure 16:
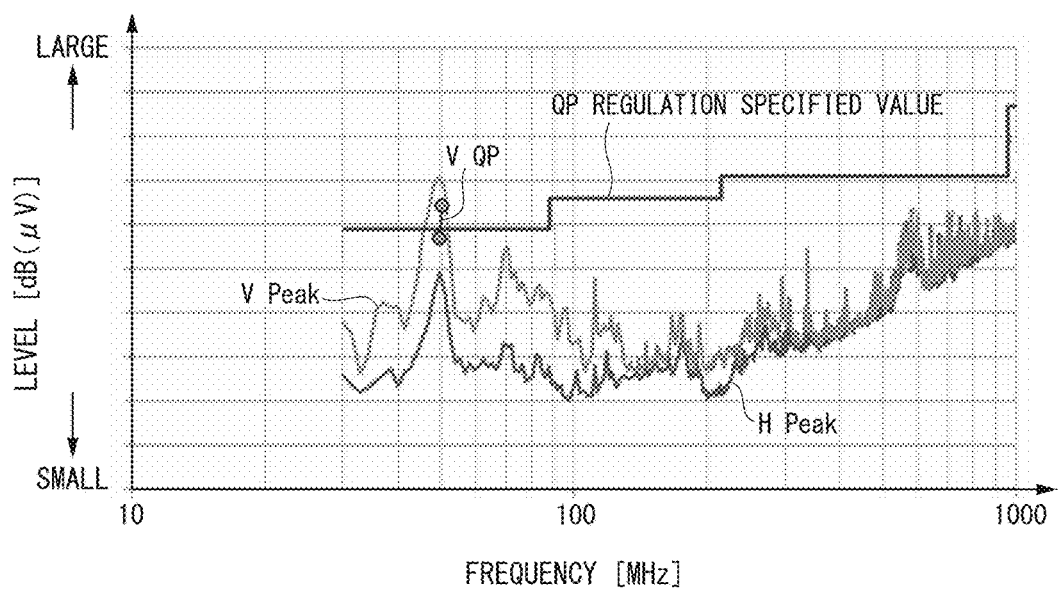
FIG. 16 is a diagram illustrating an example of a measurement result of an emission level of electromagnetic noise when a length of a wire harness according to an embodiment of the present invention is an initial length.

FIG. 15 is a diagram illustrating an example of a measurement result of an emission level of electromagnetic noise when the length L of the wire harness 14 is extended by a predetermined length using the winding portion 73. FIG. 16 is a diagram illustrating an example of a measurement result of an emission level of electromagnetic noise when the length L of the wire harness 14 is an initial length L0. FIGS. 15 and 16 illustrate a peak value (VPeak) of a vertically polarized wave, a quasi-peak detection (VQP) of the vertically polarized wave, a peak value (HPeak) of a horizontally polarized wave, and a predetermined requirement value (QP regulation specified value) with respect to a quasi-peak detection (QP).

As shown in FIG. 16, when the length L of the wire harness 14 is the initial length L0 before extension in which the winding portion 73 is not provided, the quasi-peak detection (VQP) of the vertically polarized wave is larger than the predetermined requirement value (QP regulation specified value). On the other hand, as shown in FIG. 15, when the length L of the wire harness 14 is further extended than the initial length L0 using the winding portion 73, the quasi-peak detection (VQP) of the vertically polarized wave is reduced to the predetermined requirement value (QP regulation specified value) or less. For example, a predetermined length which is an amount of extension with respect to the initial length L0 is 230 mm and the length L of the wire harness 14 after extension satisfies L$\approx$1.88$\lambda$/4.

As described above, according to the harness routing structure 10 of the electric vehicle in the embodiment, the rising wavelength $\lambda$ when the inverter device 13 is driven is the wavelength of the noise current $I_{noise}$ generated due to the high frequency component of the switching current $I_{INV}$ generated when the invertor device 13 is driven. It is possible to minimize an increase in resonance current generated due to the noise current $I_{noise}$ when the length L of the wire harness 14 is set to an integer multiple of a length which is about ½ of the rising wavelength $\lambda$ and to reduce the electromagnetic noise emitted from the wire harness 14 along with a resonance current. It is possible to reduce the actual electromagnetic noise emitted from the wire harness 14 in the electric vehicle to a predetermined specified value or less when the parameter $\lambda$a is set to satisfy 0.462$\lambda\le\lambda$a$\le$0.538$\lambda$ and the length L of the wire harness 14 is set to an integer multiple of the parameter $\lambda$a. On the other hand, when the parameter $\lambda$a is less than 0.462$\lambda$ or greater than 0.538$\lambda$, the electromagnetic noise emitted from the wire harness 14 is likely to be greater than the predetermined specified value and malfunctioning of electronic devices is likely to occur due to the electromagnetic noise.

In addition, since the wire harness 14 includes the winding portion 73, it is possible to easily adjust the length L of the wire harness 14 using the winding portion 73. It is possible to easily extend the wire harness 14 while an increase in space required for disposition is minimized using the winding portion 73 compared with, for example, when the wire harness 14 is disposed to be bent or the like.

Since the winding portion 73 is disposed in a position in which the winding portion 73 does not overlap with the power train 54 in a front view of the electric vehicle 1, it is possible to secure electrical safety without interfering with the power train 54 even when the power train 54 is displaced in a forward/rearward direction.

Also, since the winding portion 73 is fixed to the damper housing 57 by the fixing member 81, it is possible to easily fix the winding portion 73 to the vehicle body and to improve the manufacturing efficiency of the electric vehicle 1. It is possible to increase a plate thickness of the damper housing 57 and to increase the rigidity of the damper housing 57. Thus, it is possible to improve the riding comfort performance of the electric vehicle 1.

Since the bending portion 85 of the fixing member 81 is joined to the protruding portion 84 and bent downward, it is possible to increase the rigidity of the fixing member 81 and to reduce a thickness of the fixing member 81 along with an increase in rigidity. Furthermore, it is possible to reduce a size of a hood in the electric vehicle 1 and to improve the aerodynamic performance and the aesthetics.

Also, since the first supporting portion 86 and the second supporting portion 87 of the fixing member 81 support two different portions of the winding portion 73, it is possible to prevent the swing of the wire harness 14 and the winding portion 73 and to minimize occurrence of noise and vibration.

Since the fixing member 81 includes the bending flange portion 83, it is possible to prevent the wire harness 14 and the winding portion 73 from directly coming into contact with or colliding with the vehicle body even when the wire harness 14 and the winding portion 73 swing.

Since the wire harness 14 is configured to be dividable by the connecting portion 71, it is possible to secure ease of manufacture. Since the fixing member 81 includes the covering portion 88 configured to cover at least part of the connecting portion 71, it is possible to prevent the connection of the wire harness 14 from being released by mistake while the electric vehicle 1 is being inspected or the like.

Since the covering member 44 configured to cover the winding portion 73 is a twisted tube, it is possible to reduce a winding diameter compared with, for example, when the winding portion 73 is covered with a corrugated tube or the like and thus to improve mountability in the vehicle.

The embodiments according to the present invention have been exemplified and are not intended to limit the scope of the invention. These embodiments can be implemented in various other forms and various omissions, substitutions, and modifications are possible without departing from the gist of the invention. These embodiments and variations thereof are included in the scope of the invention disclosed in the claims and the equivalents thereto like the embodiments and the variations thereof are included in the scope and the gist of the invention.

What is claimed is:

1. A harness routing structure for an electric vehicle which includes a battery, an inverter device, and a harness configured to connect the battery and the inverter device, wherein:
   a length L of the harness between a battery fixing end of the battery to which the harness is fixed and an inverter fixing end of the inverter device to which the harness is fixed is an integer multiple of a parameter $\lambda$a associated with a rising wavelength $\lambda$ when the inverter device is driven, and
   the parameter $\lambda$a satisfies 0.462$\lambda\le\lambda$a$\le$0.538$\lambda$.

2. The harness routing structure for an electric vehicle according to claim 1, wherein the harness includes a winding portion.

3. The harness routing structure for an electric vehicle according to claim 2, wherein the winding portion is disposed in a position in which the winding portion does not overlap with a power train of the electric vehicle.

4. The harness routing structure for an electric vehicle according to claim 2, comprising:
a fixing member configured to fix the winding portion to the electric vehicle.

5. The harness routing structure for an electric vehicle according to claim 4, wherein the fixing member is joined to a damper housing.

6. The harness routing structure for an electric vehicle according to claim 4, wherein the fixing member includes a bending portion which is folded downward.

7. The harness routing structure for an electric vehicle according to claim 4, wherein the fixing member includes a plurality of supporting portions configured to support a plurality of different portions of the winding portion.

8. The harness routing structure for an electric vehicle according to claim 4, wherein the fixing member includes a bending flange portion.

9. The harness routing structure for an electric vehicle according to claim 4, wherein the harness includes a battery-side harness connected to the battery and an inverter-side harness connected to the inverter device, and
the fixing member includes a covering portion configured to cover at least part of a connecting portion between the battery-side harness and the inverter-side harness.

10. The harness routing structure for an electric vehicle according to claim 2, wherein the harness includes a twisted tube configured to cover the winding portion.

* * * * *